United States Patent
Jiang et al.

(12) 
(10) Patent No.: US 6,317,336 B1
(45) Date of Patent: Nov. 13, 2001

(54) CURRENT-FED DC/DC CONVERTER WITH MULTILEVEL TRANSFORMER AND METHOD OF OPERATION THEREOF

(76) Inventors: Yimin Jiang, 4005 Bullock Dr., Plano, TX (US) 75023; Hengchun Mao, 3108 Buena Vista Dr., Plano, TX (US) 75025

(*) Notice: Subject to any disclaimer, the term of this patent is extended or adjusted under 35 U.S.C. 154(b) by 0 days.

(21) Appl. No.: 09/540,957

(22) Filed: Mar. 31, 2000

(51) Int. Cl.⁷ .............................. H02M 3/335; G05F 1/14
(52) U.S. Cl. .............................................. 363/16; 323/255
(58) Field of Search .................................. 363/16, 17, 20, 363/21, 98, 132; 323/301, 255, 258; 320/139, 160

(56) References Cited

U.S. PATENT DOCUMENTS 5,408,171  *  4/1995  Eitzmann et al. ................. 323/258
5,602,462  *  2/1997  Stich et al. ....................... 323/258
5,825,164  * 10/1998  Williams .......................... 323/255
6,014,326  *  6/2000  Koch ................................ 363/132

OTHER PUBLICATIONS

U.S. Patent Application Serial No. 09/539,690, filed on Mar. 31, 2000, entitled "Current–Fed DC/DC Converter With Multilevel Transformer and Method of Operation Thereof" by Yimin Jiang, et al.

* cited by examiner

Primary Examiner—Rajnikant B. Patel

(57) ABSTRACT

A regulation circuit for a current-fed power converter having a power switch adapted to transfer power to a transformer. In one embodiment, the regulation circuit includes a switching network coupled to a tapped winding of the transformer and operable to vary a turns ratio of the transformer thereby regulating an output voltage of the power converter.

21 Claims, 2 Drawing Sheets

CURRENT-FED DC/DC CONVERTER WITH MULTILEVEL TRANSFORMER AND METHOD OF OPERATION THEREOF

CROSS-REFERENCE TO RELATED APPLICATION

This application is related to U.S. patent application, Ser. No. 09/539,690, entitled "REGULATION CIRCUIT FOR A POWER CONVERTER AND METHOD OF OPERATION THEREOF," filed concurrently herewith, commonly assigned with the present application and incorporated herein by reference.

TECHNICAL FIELD OF THE INVENTION

The present invention is directed, in general, to power converters and, more specifically, to a regulation circuit for a current-fed converter, a method of operating the regulation circuit and a power converter employing the circuit or the method.

BACKGROUND OF THE INVENTION

A power converter is a power processing circuit that converts an input voltage waveform into a specified output voltage waveform. In many applications requiring a DC output, switched-mode DC/DC converters are frequently employed to advantage. DC/DC converters generally include an inverter, a transformer, a rectifier on a secondary side of the transformer and an output filter. The inverter generally includes switching devices (power switches), such as field effect transistors (FETs), that convert a DC input voltage to an AC voltage. The transformer transforms the AC voltage to another value, and the rectifier generates the desired DC voltage to the output filter. Conventionally, the rectifier comprises a plurality of rectifying diodes that conduct the load current only when forward-biased in response to the input waveform to the rectifier. Finally, the output filter eliminates large fluctuations in the output voltage to provide an essentially constant DC voltage at the output of the converter.

A conventional current-fed DC/DC converter is often used for off-line power factor correction and battery applications due to its voltage step-up capability and its continuous input current characteristics. This conventional current-fed converter typically employs two power switches coupled to equal and opposite polarity windings on the primary side of a transformer. A traditional form of power switch control operates the two power switches in a 180 degree interleaved fashion with a duty cycle equal to or greater than 50 percent. When both power switches are on, the input voltage is applied to an input inductor causing its current to increase. Then, when one of the power switches is turned off, the current in the input inductor continues to flow through the connected primary winding thereby transferring power to an output load.

This causes the conventional current-fed converter to transfer power only during a portion of a switching cycle, which becomes even smaller as the input voltage becomes smaller. This characteristic of the conventional current-fed converter causes the output current to be discontinuous and to pulsate strongly. A discontinuous and strongly pulsating output current greatly increases the difficulty in designing both the transformer and the output filter, typically forcing them to be physically larger. Additionally, overall converter efficiency is also lower due to the discontinuous operating characteristics.

Accordingly, what is needed in the art is a way to improve the operating characteristics, overall efficiency of a current-fed converter, while maintaining or reducing component size at the same time.

SUMMARY OF THE INVENTION

To address the above-discussed deficiencies of the prior art, the present invention provides a regulation circuit for a current-fed power converter having a power switch adapted to transfer power to a transformer. In one embodiment, the regulation circuit includes a switching network coupled to a tapped winding of the transformer and operable to vary a turns ratio of the transformer thereby regulating an output voltage of the power converter.

The present invention introduces, in one aspect, the broad concept of using a switching circuit to vary a turns ratio of a transformer to regulate an output voltage of the converter. Additionally, conversion efficiency is improved, magnetic components may be reduced in size and component stresses may be minimized. The current-fed power converter allows the transformer to continuously deliver energy to the output thereby utilizing the transformer more efficiently and reducing output pulsating current at the same time.

In one embodiment of the present invention, the switching network includes at least one regulation switch, coupled to the tapped winding. The regulation switch may be selected from the group consisting of (1) a metal oxide semiconductor field-effect transistor, (2) a bipolar junction transistor, (3) an insulated gate bipolar transistor; and (4) a gate turn-off thyristor. Of course, other controllable switches are well within the broad scope of the present invention.

In one embodiment of the present invention, the switching network includes a diode coupled to the tapped winding. The diode may thus prevent reverse current flow through the tapped winding. Of course, those skilled in the art recognize that an active switch may be employed in place of the diode.

In one embodiment of the present invention, the power converter further has a rectifier coupled to the tapped winding, wherein the switching network includes first and second diodes coupled to opposing ends of the tapped winding. A regulation switch is coupled between the first and second diodes and an output of the power converter.

In one embodiment of the present invention, the tapped winding is a first tapped primary winding wherein the transformer has a second tapped primary winding. In an embodiment to be illustrated and described, the switching network includes a diode and a regulation switch coupled to the first tapped primary winding, and a second diode coupled to the second tapped primary winding.

In one embodiment of the present invention, the power converter is a boost power converter. Conventional power converters, such as the boost power converter, are familiar to those skilled in the art. Of course, the present invention is not limited to the power converter topologies disclosed herein.

In one embodiment of the present invention, the power converter further has a second power switch, wherein the power switch and the second power switch operate in an interleaved manner.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
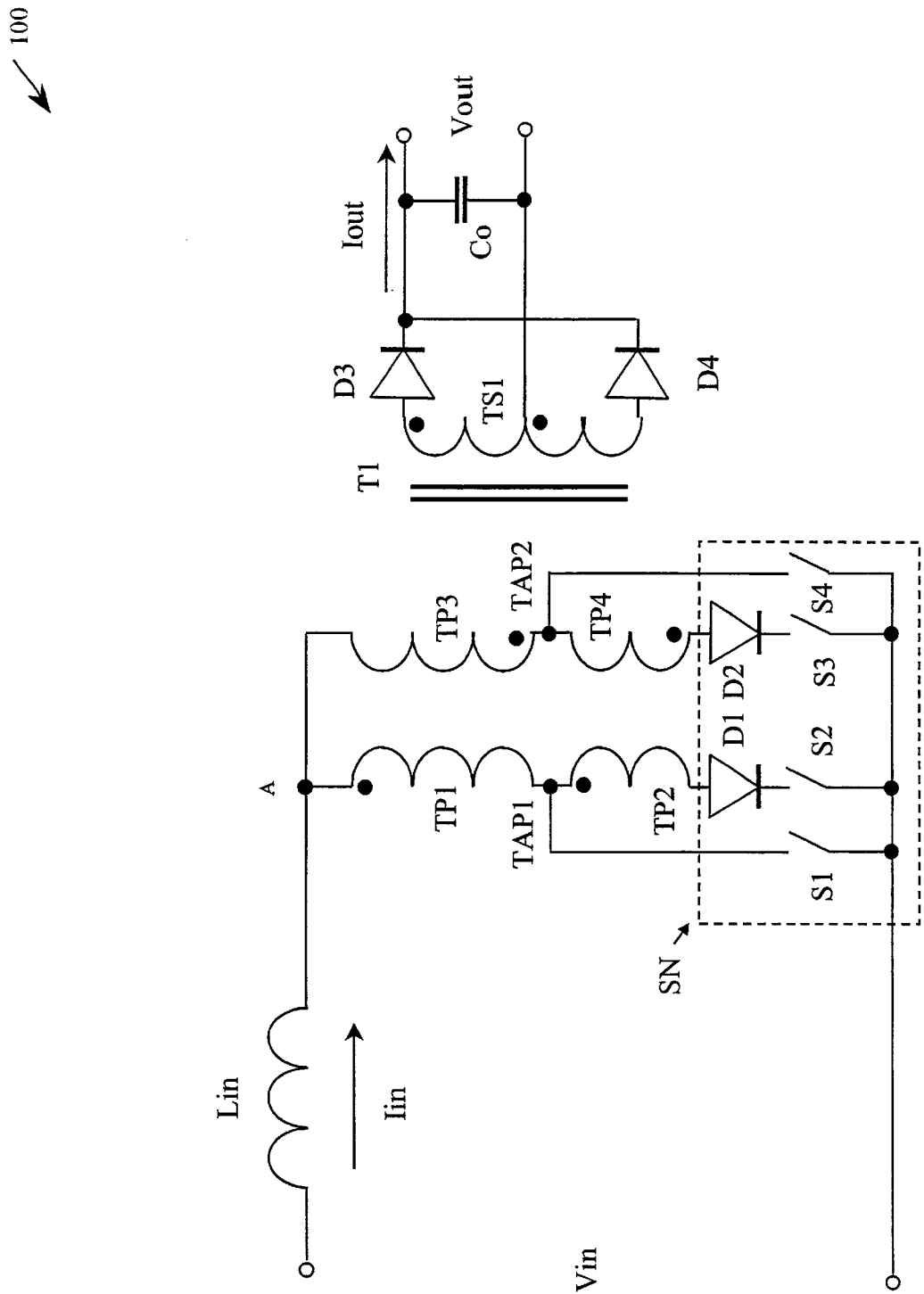
FIG. 1 illustrates a schematic diagram of an embodiment of a power converter constructed according to the principles of the present invention.

Referring initially to FIG. 1, illustrated is a schematic diagram of an embodiment of a current-fed power converter 100 constructed according to the principles of the present invention. The power converter 100, connected to an input DC voltage Vin, includes an input inductor Lin having an inductor current Iin and a transformer T1, having first and second tapped primary windings TP1/TP2, TP3/TP4 and a secondary winding TS1. The power converter 100 also includes a switching network SN having first, second, third and fourth power regulation switches S1, S2, S3, S4 and first and second diodes D1, D2 coupled to the first and second tapped primary windings TP1/TP2, TP3/TP4, respectively. The power converter 100 still further includes third and fourth diodes D3, D4 coupled to the secondary winding TS1 and an output capacitor Co coupled to an output voltage Vout with an output current Iout.

The first tapped primary winding TP1/TP2 consists of a first primary winding TP1 connected in series with a second primary winding TP2 to form a first primary tap TAP1 at their junction. The second tapped primary winding TP3/TP4 consists of a third primary winding TP3 connected in series with a fourth primary winding TP4 to form a second primary tap TAP2 at their junction.

The switching network SN, in the illustrated embodiment, performs a power switching function (including transferring power from the input to the transformer T1) and embodies a regulation circuit constructed according to the principles of the present invention. In the illustrated embodiment, the switching network SN regulates the output voltage Vout by varying a turns ratio of the transformer T1 thereby transferring power on a continuous basis to an output load. The first and second diodes D1, D2 coupled to the first and second tapped primary windings TP1/TP2, TP3/TP4 prevent reverse current flow through each of their respective tapped windings. The first, second, third and fourth power regulation switches S1, S2, S3, S4 may typically be selected from the group consisting of a metal oxide semiconductor field-effect transistor, a bipolar junction transistor, an insulated gate bipolar transistor, and a gate turn-off thyristor. Of course, other controllable switches are well within the broad scope of the present invention.

Operation of the power converter 100 may be accomplished in several ways. One way is to alternately close the first, second, third and fourth power regulation switches S1, S2, S3, S4 in a mutually exclusive and ordered fashion. Closing the first power regulation switch S1 for a first portion of the timing period causes both the inductor current Iin and the output current Iout to increase. This occurs since a voltage Va at node A is now smaller than the input DC voltage Vin. Then, opening the first power regulation switch S1 and closing the second power regulation switch S2 for a second portion of the timing period causes both the inductor current Iin and the output current Iout to decrease. This occurs since the voltage Va at node A is now larger than the input DC voltage Vin. This larger voltage Va is generated when an essentially constant output voltage Vout is reflected through an increased turns ratio created when the second primary winding TP2 is added by opening the first power regulation switch S1 and closing the second power regulation switch S2. In both of these cases, the inductor current Iin and the output current Iout remain continuous.

When the second power regulation switch S2 is opened and the fourth power regulation switch S4 is closed, both the inductor current Iin and the output current Iout begin to increase again since the voltage Va at node A is once again smaller than the input DC voltage Vin due to a reduced turns ratio. The cycle is completed with the opening of the fourth power regulation switch S4 and the closing of the third power regulation switch S3. This causes the voltage Va at node A to be greater than the input DC voltage Vin again due to a turns ratio increase and both the inductor current Iin and the output current Iout decrease. The aforementioned operation causes the voltage Va at node A to be a symmetrical square wave around an average value of the input DC voltage Vin, having half the period of the overall regulation switch timing period.

Another way of operating the power converter 100 is to close the first and second power regulation switches S1, S2 together and then open the first power regulation switch S1 at the end of the first portion of a timing period while leaving the second power regulation switch S2 closed for the second portion of the timing period. This causes the voltage Va at node A to be smaller than the input DC voltage Vin for the first portion of the timing period and then to be greater than the input DC voltage Vin during the second portion of the timing period.

The second power regulation switch S2 then opens as both the third and fourth power regulation switches S3, S4 close together at the beginning of the third portion of the timing period. The fourth power regulation switch S4 opens at the beginning of the fourth portion of the timing period, leaving the third power regulation switch 53 closed. The aforementioned operation causes the voltage Va at node A to be smaller than the input DC voltage Vin for the third portion of the timing period and then to be greater than the input DC voltage Vin during the fourth portion of the timing period. This power regulation switch control sequence again causes the voltage Va at node A to be a symmetrical square wave around an average value of the input DC voltage Vin, having a period about half that of the overall power regulation switch timing period. As before, both the inductor current Iin and the output current Iout are continuous and increase and decrease together, respectively, when the voltage Va at node A is smaller and then greater than the input DC voltage Vin.

Figure 2:
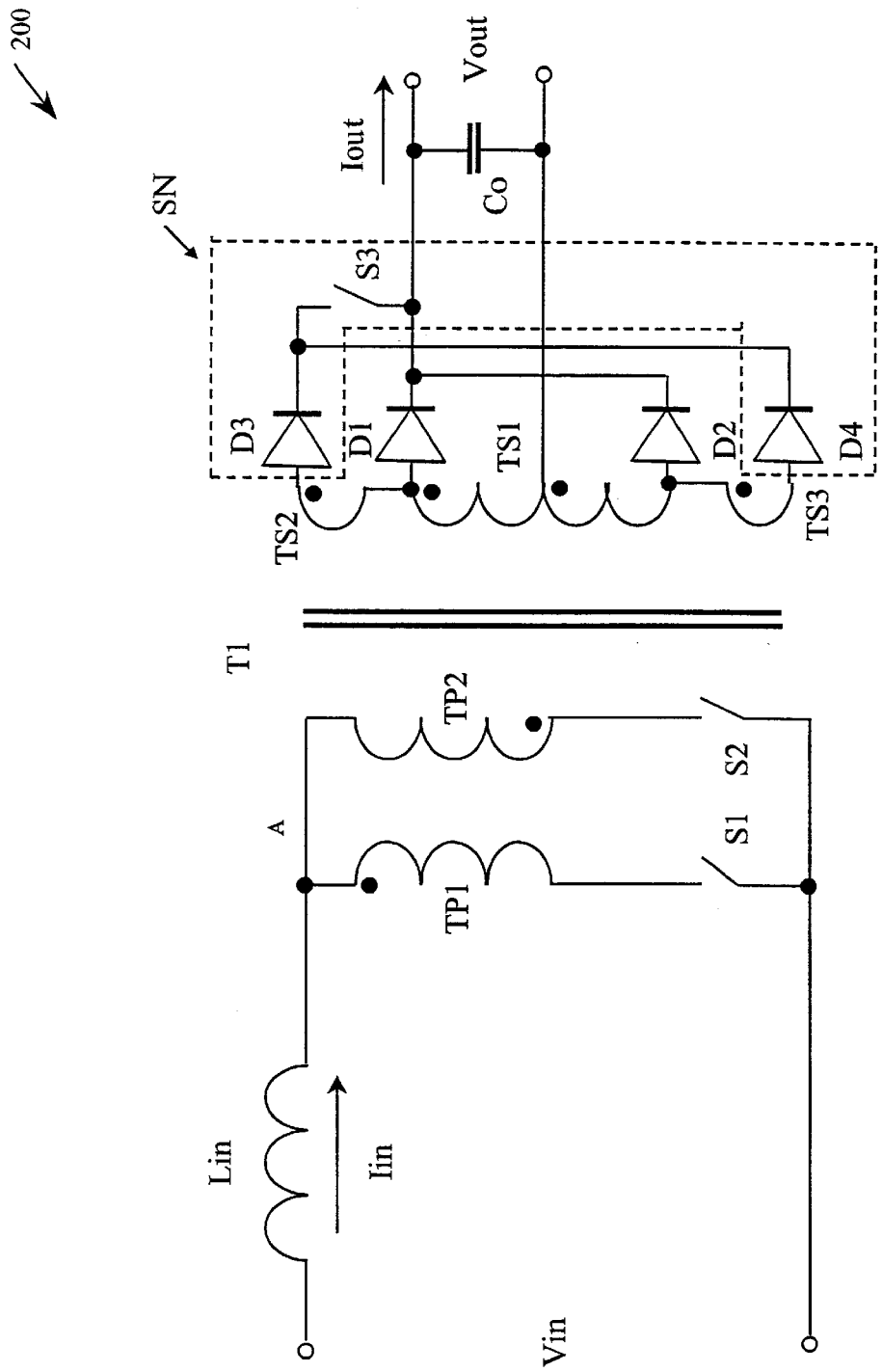
FIG. 2 illustrates a schematic diagram of another embodiment of a power converter constructed according to the principles of the present invention.

Turning now to FIG. 2, illustrated is a schematic diagram of another embodiment of a power converter 200 constructed according to the principles of the present invention. The power converter 200, connected to an input DC voltage Vin, includes an input inductor Lin having an inductor current Iin and a transformer T1 having first and second primary windings TP1, TP2 and a multilevel tapped secondary winding structure TS1/TS2/TS3 having first, second and third secondary windings TS1, TS2, TS3. The power converter 200 also includes first and second power switches S1, S2 that transfer power from the input to the transformer T1 and a rectifier having first and second diodes D1, D2 interposed between the tapped secondary winding structure TS1/TS2/TS3 and an output of the power converter 200. The power converter 200 still further includes a switching network SN having a regulation switch S3 and third and fourth diodes D3, D4 coupled to the multilevel secondary tapped winding structure TS1/TS2/TS3. The power converter 200 still further includes an output capacitor Co coupled to the output having an output voltage Vout and an output current Iout.

The power converter 200 is another example of a current-fed power converter. The switching network SN, in the illustrated embodiment, embodies a regulation circuit constructed according to the principles of the present invention. In the illustrated embodiment, the switching network SN regulates the output voltage Vout by varying a turns ratio on the secondary side of the transformer T1 thereby transferring power to an output load.

Operation of the power converter 200 may be accomplished wherein the first power switch S1 and the second power switch S2 operate in an interleaved manner with one or the other being closed at any given time. An operating cycle begins by closing the first power switch Si and the regulation switch S3 together for the first portion of a timing period. This causes both the inductor current Iin and the output current Iout to begin increasing. Then, the regulation switch S3 is opened at the beginning of the second portion of the timing period while the first power switch Si remains closed for the second portion of the timing period. Opening the regulation switch S3 causes the voltage Va at a node A to increase, since the output voltage Vout is essentially constant and the secondary to primary turns ratio of the transformer T1 effectively increases. This causes the inductor current Iin and the output current Iout to begin decreasing. In both cases, however, the inductor current Iin and the output current Iout reflect a continuous conduction mode of operation.

At the beginning of the third portion of the timing period, both the second power switch S2 and the regulation switch S3 close. This causes both the inductor current Iin and the output current Iout to begin increasing again. Then, the regulation switch S3 is opened at the beginning of the fourth portion of the timing period while the second power switch S2 remains closed during the fourth portion of the timing period. Opening the regulation switch S3 causes the voltage Va at a node A to increase again, and both the inductor current Iin and the output current Iout begin decreasing while remaining in a continuous conduction mode of operation. This completes a timing period and the sequence starts over.

While specific embodiments of the current-fed power converter have been illustrated and described, other power converter embodiments (and related methods) including a regulation circuit operable to vary a turns ratio of a transformer therein are well within the broad scope of the present invention. For a better understanding of power electronics, including power rectifiers and boost converters, see *Power Electronics: Converters, Applications and Design*, by N. Mohan, T. M. Undeland and W. P. Robbins, John Wiley & Sons Publishing Company (1989), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a current-fed power converter having an input inductor and a power switch adapted to transfer power to a transformer, a regulation circuit, comprising:
    a switching network, coupled to a tapped winding of said transformer, operable to vary a turns ratio of said transformer as a function of a voltage at a node between said input inductor and said transformer thereby regulating an output voltage of said power converter.

2. The regulation circuit as recited in claim 1 wherein said switching network comprises at least one regulation switch, coupled to said tapped winding, selected from the group consisting of:
    a metal oxide semiconductor field-effect transistor;
    a bipolar junction transistor;
    an insulated gate bipolar transistors; and
    a gate turn-off thyristor.

3. The regulation circuit as recited in claim 1 wherein said switching network comprises a diode coupled to said tapped winding.

4. The regulation circuit as recited in claim 1 wherein said power converter further has a rectifier coupled to said tapped winding, said switching network comprising:
    first and second diodes coupled to opposing ends of said tapped winding; and
    a regulation switch coupled between said first and second diodes and an output of said power converter.

5. The regulation circuit as recited in claim 1 wherein said tapped winding is a first tapped primary winding, said transformer having a second tapped primary winding, said switching network comprising:
    a diode and a regulation switch coupled to said first tapped primary winding; and
    a second diode coupled to said second tapped primary winding.

6. The regulation circuit as recited in claim 1 wherein said power converter is a boost power converter.

7. The regulation circuit as recited in claim 1 wherein said power converter further has a second power switch, said power switch and said second power switch operable in an interleaved manner.

8. For use with a current-fed power converter having an input inductor and a power switch adapted to transfer power to a transformer, a method of regulating said power converter, comprising:
    operating a switching network, coupled to a tapped winding of said transformer, to vary a turns ratio of said transformer as a function of a voltage at a node between said input inductor and said transformer thereby regulating an output voltage of said power converter.

9. The method as recited in claim 8 wherein said switching network comprises at least one regulation switch, coupled to said tapped winding, selected from the group consisting of:
    a metal oxide semiconductor field-effect transistor;
    a bipolar junction transistor;
    an insulated gate bipolar transistors; and
    a gate turn-off thyristor.

10. The method as recited in claim 8 wherein said switching network comprises a diode coupled to said tapped winding.

11. The method as recited in claim 8 wherein said power converter further has a rectifier coupled to said tapped winding, said switching network comprising:

first and second diodes coupled to opposing ends of said tapped winding; and a regulation switch coupled between said first and second diodes and an output of said power converter.

12. The method as recited in claim 8 wherein said tapped winding is a first tapped primary winding, said transformer having a second tapped primary winding, said switching network comprising:

a diode and a regulation switch coupled to said first tapped primary winding; and a second diode coupled to said second tapped primary winding.

13. The method as recited in claim 8 wherein said power converter is boost power converter.

14. The method as recited in claim 8 wherein said power converter further has a second power switch, said power switch and said second power switch operable in an interleaved manner.

15. A current-fed power converter, comprising:

an input inductor coupled to an input of said power converter;

a transformer having a tapped winding;

a power switch adapted to transfer power from said input via said input inductor to said transformer;

a regulation circuit, including:

a switching network, coupled to said tapped winding, operable to vary a turns ratio of said transformer as a function of a voltage at a node between said input inductor and said transformer thereby regulating an output voltage of said power converter.

16. The power converter as recited in claim 15 wherein said switching network comprises at least one regulation switch, coupled to said tapped winding, selected from the group consisting of:

a metal oxide semiconductor field-effect transistor;

a bipolar junction transistor;

an insulated gate bipolar transistors; and a gate turn-off thyristor.

17. The power converter as recited in claim 15 wherein said switching network comprises a diode coupled to said tapped winding.

18. The power converter as recited in claim 15 further comprising a rectifier coupled to said tapped winding, said switching network comprising:

first and second diodes coupled to opposing ends of said tapped winding; and a regulation switch coupled between said first and second diodes and an output of said power converter.

19. The power converter as recited in claim 15 wherein said tapped winding is a first tapped primary winding, said transformer further having a second tapped primary winding, said switching network comprising:

a diode and a regulation switch coupled to said first tapped primary winding; and a second diode coupled to said second tapped primary winding.

20. The power converter as recited in claim 15 wherein said power converter is a boost power converter.

21. The power converter as recited in claim 15 further comprising a second power switch, said power switch and said second power switch operable in an interleaved manner.

* * * * *